J. K. DALTON.
COUPLING.
APPLICATION FILED JULY 9, 1914.

1,160,050.

Patented Nov. 9, 1915.

Witnesses
F. B. Hoffman
V. B. Hillyard

Inventor
J. K. Dalton
By Victor J. Evans
Attorney

UNITED STATES PATENT OFFICE.

JAMES K. DALTON, OF WAVERLY, OHIO.

COUPLING.

1,160,050.　　　　　Specification of Letters Patent.　　Patented Nov. 9, 1915.

Application filed July 9, 1914.　Serial No. 850,011.

*To all whom it may concern:*

Be it known that I, JAMES K. DALTON, a citizen of the United States, residing at Waverly, in the county of Pike and State of Ohio, have invented new and useful Improvements in Couplings, of which the following is a specification.

The invention provides means whereby pneumatic devices may be inflated to a predetermined degree of pressure, thereby preventing excessive pressure when inflating.

The invention provides means for connecting a flexible tube to the ordinary air valve of a pneumatic tire or like part, means for indicating the pressure, and means for relieving such pressure when the predetermined degree is reached, all of said means being combined in a single structure which involves a simple and compact arrangement of elements which are easily operable and positive and certain in action.

The invention consists of the novel features, details of construction and combination of parts, which hereinafter will be more particularly set forth, illustrated in the accompanying drawing, and pointed out in the appended claim.

Figure 1:
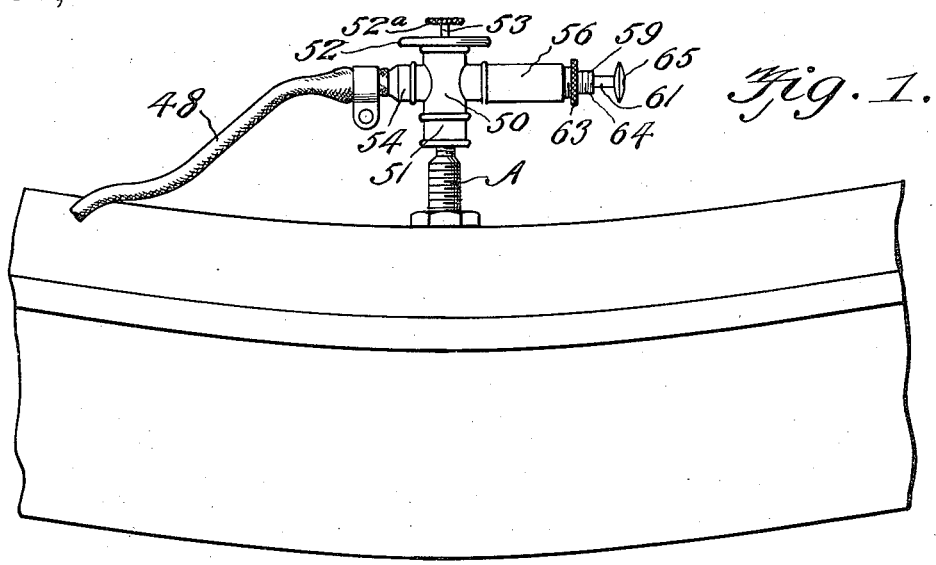
Figure 2:
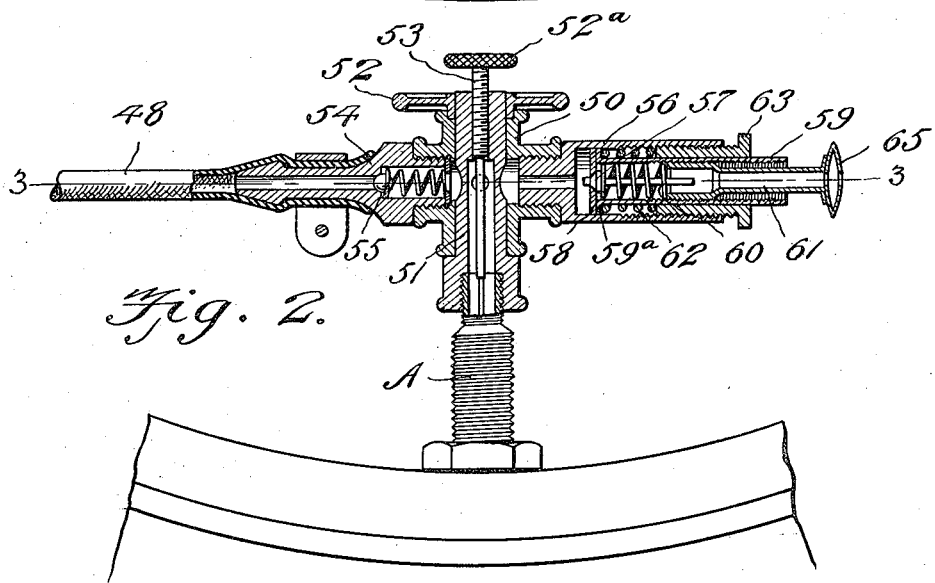
Figure 3:
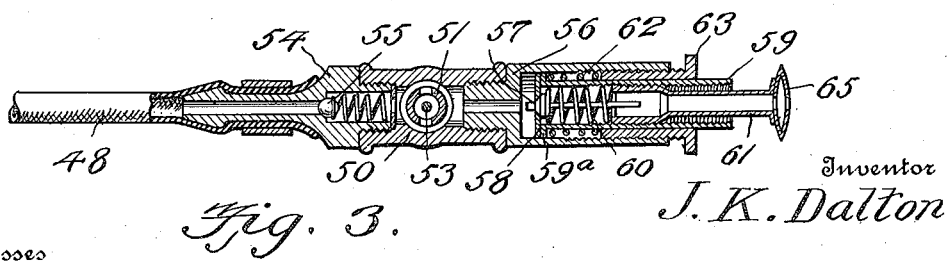

Referring to the drawing, forming a part of the specification, Figure 1 is a view in elevation of a combined connector, pressure indicator and regulator embodying the invention. Fig. 2 is a central longitudinal section. Fig. 3 is a section on the line $x$—$x$ of Fig. 2.

Corresponding and like parts are referred to in the following description, and indicated in all the views of the drawing, by the same reference characters.

The coupling comprises a body 50 having four coupling ends, said body having an opening in which a plug 51 is mounted to turn, said plug having a threaded socket at one end to make connection with the threaded end of an air valve A, such as commonly provided in connection with pneumatic tires or like devices to be inflated. A button or thumb wheel 52 is provided at the opposite end of the plug 51 to admit of rotating the latter when making connection with or detaching the device from the threaded end of the air valve A. A stem 53 is centrally mounted within the plug 51 and makes screwthread connection therewith, said stem having its outer end projecting beyond the thumb wheel 52 and provided with a milled thumb piece 52ª to admit of turning the stem when it is required to advance or retract the same. The inner portion of the stem 53 is reduced and is adapted to enter the opening of the air valve A so as to engage with the stem of the closing valve and hold the same open during the operation of inflating the tire or like part. An end piece 54 is threaded to one of the ends of the body 50 and is adapted to have a flexible tube 48 connected thereto, said tube extending from a suitable source of air supply. A spring actuated valve 55 closes the opening through the part 54 and prevents any loss of pressure.

A short tube 56 is threaded to the coupling end of the part 50 opposite the connection 54 and said tube is internally threaded at its outer end to receive a collar 63 which receives a tube 59 having an outwardly extending flange 59ª at its inner end against which one end of an expansible helical spring 62 engages, the opposite end of such spring engaging the inner end of the collar 63. The tube 59 is slidable in the collar 63 and is provided in its length with graduations 64, which indicate the pressure according to the relative position of the tube 59 with reference to the collar 63. A disk 58 is slidable within the inner end of the tube 56 and is provided at a central point with an opening which is beveled to provide a valve seat upon which a valve 57 closes, said valve being held seated by means of an expansible helical spring 60, which is mounted upon the stem of the valve 57 and is confined between such valve and a tube 61 threaded into the tube 59. A whistle 65 is located at the outer end of the tube 61 and gives warning when the valve 57 is unseated. This alarm is of particular advantage when the device is used after dark, thereby giving warning when the tire or like part is inflated to the required pressure. It is to be understood that the tube 61 may be adjusted to regulate the tension of the spring 60 so that the valve 57 may unseat at any pressure, such as may be indicated by the tube 59.

The flexible tube 48 attached to the part 54 may be connected to any type of air compressor or other device for supplying compressed air. When it is required to inflate a tire or other article the coupling end of the plug 51 is fitted to the threaded end of the air valve A and is connected thereto by rotating such plug 51, which may be readily effected by means of the thumb wheel 52.

After proper connection is made the valve of the part A is tapped in the usual way or may be held open by means of the stem 53. After proper connection is made the air pressure is turned on and after the tire or other part has been inflated to the predetermined degree, which is made known by the scale indication on the tube 59, the valve 57 opens, thereby permitting excessive pressure to escape through the tube 61, such escape of pressure being made known by the sounding of the whistle or alarm 65. The stem 53 is now backed to permit seating of the valve of the part A, after which the plug 51 is turned to disconnect the same from the air valve A.

It will be understood from the foregoing, taken in connection with the accompanying drawing that the device provides a single structure, means for coupling an air supplying tube to an air valve, means for indicating pressure and means for relieving excessive pressure, said device being compact and positive and certain in operation.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A coupling comprising a rotatably mounted plug adapted to have threaded engagement with a valve, a stem adjustably mounted therein and adapted to open said valve when moved in one direction, a hollow body encircling said plug and rotatable therearound, a tube threaded into said body, a collar threaded within the tube, a second tube slidably mounted within the first mentioned tube and collar and provided with scale graduations, said second tube having one extremity flanged, an expansion spring mounted between the collar and the flanged extremity of the tube slidable therein, a valve seat slidable in the first mentioned tube and movable with the second mentioned tube, a relief valve closing upon the valve seat, a spring for holding the relief valve seated and a third tube threaded into the second tube and adapted to vary the tension of the spring holding the relief valve seated.

In testimony whereof I affix my signature in presence of two witnesses.

JAMES K. DALTON.

Witnesses:
  PERIS HUTT,
  THOS. A. BROWN.